United States Patent
Hwang et al.

(10) Patent No.: US 11,104,379 B2
(45) Date of Patent: Aug. 31, 2021

(54) TRAVEL CONTROL SYSTEM AND METHOD FOR VEHICLE

(71) Applicants: HYUNDAI MOTOR COMPANY, Seoul (KR); KIA MOTORS CORPORATION, Seoul (KR)

(72) Inventors: Sang Woo Hwang, Seoul (KR); Young Dae Park, Asan-si (KR); Byung Rim Lee, Seongnam-si (KR); Min Jun Kim, Busan (KR); Se Hyun Chang, Suwon-si (KR); Hyeon Seok Cho, Pyeongtaek-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 422 days.

(21) Appl. No.: 16/167,671

(22) Filed: Oct. 23, 2018

(65) Prior Publication Data
US 2019/0176881 A1 Jun. 13, 2019

(30) Foreign Application Priority Data
Dec. 11, 2017 (KR) ........................ 10-2017-0168967

(51) Int. Cl.
*B62D 15/02* (2006.01)
*B60K 35/00* (2006.01)
(Continued)

(52) U.S. Cl.
CPC ............. *B62D 6/002* (2013.01); *B62D 1/046* (2013.01); *B62D 1/10* (2013.01); *B62D 7/14* (2013.01);
(Continued)

(58) Field of Classification Search
CPC .. B62D 15/02; B62D 15/021; B62D 15/0295; B60W 10/20; B60K 35/00
(Continued)

(56) References Cited

U.S. PATENT DOCUMENTS 10,392,050 B2 * 8/2019 Kim ..................... B62D 5/0463
10,427,714 B2 * 10/2019 Hwang ................. B62D 15/021
(Continued)

FOREIGN PATENT DOCUMENTS

KR 10-1796639 B1 11/2017

OTHER PUBLICATIONS

Haptic skin stretch on a steering wheel for displaying preview information in autonomous cars; Christopher J. Ploch; Jung Hwa Bae; Wendy Ju; Mark Cutkosky; 2016 IEEE/RSJ International Conference on Intelligent Robots and Systems (IROS) Year: 2016; IEEE Conference Paper. (Year: 2016).*

(Continued)

*Primary Examiner* — Cuong H Nguyen

(57) ABSTRACT

A travel control system and a method for an autonomous vehicle is provided to easily determine a rotating position of a steering wheel when an autonomous travel mode is switched to a driver's travel mode. The travel control system includes: a display mechanism provided in a central portion of a steering wheel to display a rotating position of the steering wheel; and a controller to controls the display mechanism to display the rotating position of the steering wheel based on a steering angle of a tire when the steering angle of the tire is input and the autonomous travel mode is switched to the driver travel mode.

2 Claims, 5 Drawing Sheets

(51) Int. Cl.
*B62D 6/00* (2006.01)
*B62D 7/14* (2006.01)
*B62D 1/10* (2006.01)
*B62D 1/04* (2006.01)

(52) U.S. Cl.
CPC .......... *B62D 15/02* (2013.01); *B62D 15/021* (2013.01); *B62D 15/025* (2013.01); *B62D 15/029* (2013.01); *B60G 2200/44* (2013.01)

(58) Field of Classification Search
USPC .......................................................... 701/41
See application file for complete search history.

(56) References Cited

U.S. PATENT DOCUMENTS

| | | | |
|---|---|---|---|
| 10,545,498 B2* | 1/2020 | Christiansen | B60R 1/00 |
| 10,962,429 B2* | 3/2021 | Hwang | B62D 5/006 |
| 2006/0080015 A1* | 4/2006 | Voeller | G01B 21/26 |
| | | | 701/41 |
| 2009/0273563 A1* | 11/2009 | Pryor | G06F 3/016 |
| | | | 345/157 |
| 2016/0075377 A1* | 3/2016 | Tomozawa | B60R 1/00 |
| | | | 701/41 |
| 2016/0129836 A1* | 5/2016 | Sugita | B62D 15/0295 |
| | | | 701/41 |
| 2017/0144688 A1* | 5/2017 | Pitzer | B60Q 3/283 |
| 2017/0267285 A1* | 9/2017 | Abbas | B62D 1/00 |
| 2017/0274931 A1* | 9/2017 | Yang | B62D 15/0295 |
| 2018/0141585 A1* | 5/2018 | Kim | B62D 5/001 |
| 2018/0162442 A1* | 6/2018 | Hwang | B62D 5/005 |
| 2018/0229767 A1* | 8/2018 | James | B62D 15/0245 |
| 2019/0025823 A1* | 1/2019 | Christiansen | B62D 15/029 |
| 2019/0176881 A1* | 6/2019 | Hwang | B62D 15/029 |
| 2019/0389503 A1* | 12/2019 | Hwang | B62D 5/0469 |
| 2020/0088596 A1* | 3/2020 | Hwang | B62D 6/008 |
| 2020/0114960 A1* | 4/2020 | Kim | B62D 6/008 |
| 2020/0130733 A1* | 4/2020 | Hwang | B62D 5/001 |
| 2021/0141294 A1* | 5/2021 | Hwang | G03B 17/561 |

OTHER PUBLICATIONS

Impact of Directive Visual Information on Driver's Emergency Behavior; Akira Utsumi;Nao Kawanishi;Isamu Nagasawa;Kenichi Satou;Kyouhei Uchikata;Norihiro Hagita; 2018 21st International Conference on Intelligent Transportation Systems (ITSC) IEEE Conference Paper. (Year: 2018).*

Enabling quantitative analysis of situation awareness: system architecture for autonomous vehicle handover studies; Tamás D. Nagy;Nikita Ukhrenkov;Daniel A. Drexler;Árpád Takács;Tamás Haidegger; 2019 IEEE International Conference on Systems, Man and Cybernetics (SMC); IEEE Conference Paper. (Year: 2019).*

Path planning for autonomous underwater vehicle docking in stationary obstacle environment; Chenzhan Liu;Shuangshuang Fan; Bo Li;Shumin Chen;Yuanxin Xu;Wen Xu; OCEANS 2016—Shanghai'; IEEE Conference Paper, (Year: 2016).*

Guaranteed Cost Model Predictive Control-based Driver Assistance system for vehicle stabilization under tire parameters uncertainties; Carlos M. Massera;Marco H. Terra;Denis F. Wolf; 2016 IEEE 19th International Conference on Intelligent Transportation Systems (ITSC); IEEE Conference Paper, (Year: 2016).*

Indirect Shared Control for Cooperative Driving Between Driver and Automation in Steer-by-Wire Vehicles R Li, Y Li, SE Li, C Zhang, E Burdet . . . —IEEE Transactions on . . . 2020—ieeexplore.ieee.org.*

Steering angle assisted vehicular navigation using portable devices in GNSS-denied environments M Moussa, A Moussa, N El-Sheimy—Sensors 2019, 19(7), 1618; https://doi.org/10.3390/s19071618.*

* cited by examiner

TRAVEL CONTROL SYSTEM AND METHOD FOR VEHICLE

CROSS-REFERENCE TO RELATED APPLICATION

This application claims the priority to and the benefit of Korean Patent Application No. 10-2017-0168967, filed on Dec. 11, 2017, the entire contents of which are incorporated herein by reference.

FIELD

The present disclosure relates to a travel control system and method for a vehicle.

BACKGROUND

The statements in this section merely provide background information related to the present disclosure and may not constitute prior art.

In a Steer-By-Wire (SBW) system, a steering wheel module and a tire steering module are physically separated so that a steering wheel can be kept stationary even though a tire is steered.

By using such a structural design, it is possible to inhibit or prevent the steering wheel from being continuously rotated when the tire is steered while an autonomous vehicle is traveling in the autonomous traveling mode.

Thus, the steering wheel may be stored, and only when the driver needs the steering wheel, may be taken out such that the driver is capable of controlling the vehicle in the driver travel mode in which the driver directly operates the vehicle.

However, we have discovered that in order to reduce a sense of difference caused by switching from the autonomous travel mode to the driver travel mode and to improve the driver's steering feeling, a process of synchronizing the steering wheel with the steering angle of the tire is desired. However, there are complex and difficult problems in naturally synchronizing the steering wheel with the steering angle of the tire.

It should be understood that the foregoing description of the background art is merely for the purpose of promoting an understanding of the background of the present disclosure and should not to be accepted as acknowledging that the background art is known to those skilled in the art.

SUMMARY

The present disclosure provides a vehicle travel control system and method in which the rotating position of a steering wheel with respect to a tire steering angle is easily determined using a visual effect when switching from an autonomous travel mode to a driver travel mode.

In an aspect of the present disclosure, a travel control system for an autonomous travel vehicle is equipped with a Steer-By-Wire (SBW) system. The travel control system may include: a display mechanism provided in a central portion of a steering wheel and configured to display a rotating position of the steering wheel; and a controller configured to control the display mechanism to display the rotating position of the steering wheel based on a steering angle of a tire when the steering angle of the tire is input and an autonomous travel mode is switched to a driver travel mode.

The display mechanism may be a touch panel provided in a shape fitted to a central space of a rim of the steering wheel. The display mechanism may be configured to be input with a driving requirement in the autonomous driving mode and to display a driving route.

In another form, a steering control method is a travel control method of an autonomous travel vehicle equipped with a Steer-By-Wire (SBW) system. The steering control method may include controlling, by a controller, a display mechanism provided in a central portion of a steering wheel to display a rotating position of the steering wheel when switching from an autonomous travel mode to a driver travel mode is determined.

The travel control method may further include: receiving, by the controller, an input steering angle of a tire when the switching to the driver travel mode is determined; calculating, by the controller, a rotating angle of the steering wheel corresponding to the steering angle of the tire; and controlling, by the controller, the display mechanism to display a rotating position of the steering wheel corresponding to the calculated rotating angle of the steering wheel.

A control may be performed in such a manner that when the steering angle of the tire changes and the steering wheel is not rotated, only the rotating position of the steering wheel displayed on the display mechanism rotates based on a change to the steering angle of the tire.

The travel control method may further include: determining whether the steering wheel rotates; and performing, when the steering wheel rotates, a control such that the rotating position of the steering wheel displayed on the display mechanism rotates based on the rotating of the steering wheel.

Whether or not the steering wheel rotates may be determined using a steering angle sensor provided on the steering wheel.

Through the features as described above, in the present disclosure, when switching from the autonomous travel mode to the driver travel mode is performed, the virtual spoke image of the steering wheel based on the current angular steering position of the tire is displayed on the display mechanism. Thus, the rotating position of the steering wheel is recognized.

Therefore, the driver is able to easily determine the rotating position of the steering wheel corresponding to the steering angle of the tire, without any physical synchronization between the steering angle of the tire and the steering wheel. Thus, the driver is able to quickly and naturally switch the travel mode from the autonomous travel mode to the driver travel mode without providing the driver with a sense of difference.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
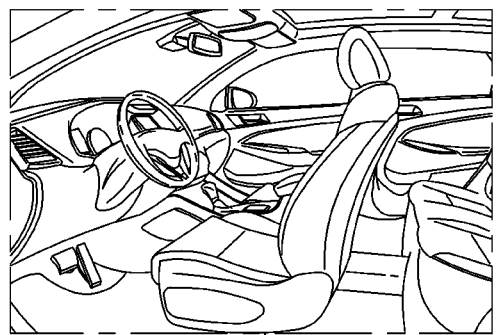
FIG. 1A is a view schematically illustrating an interior of a vehicle including a vehicle travel control system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A vehicle travel control system of the present disclosure may include a display mechanism 3 and a controller "C".

Figure 1B:
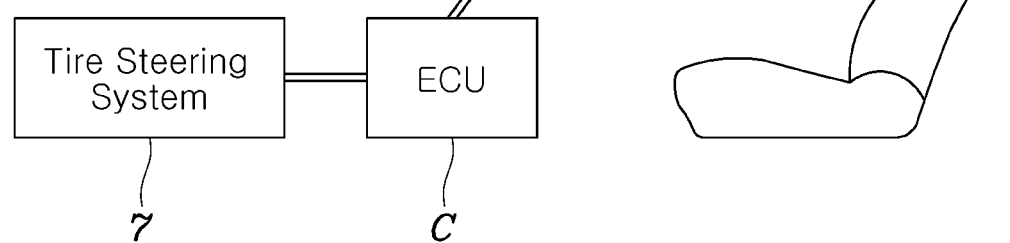
FIG. 1B is a schematic view illustrating a vehicle travel control system equipped with an SBW system.
Figure 2:
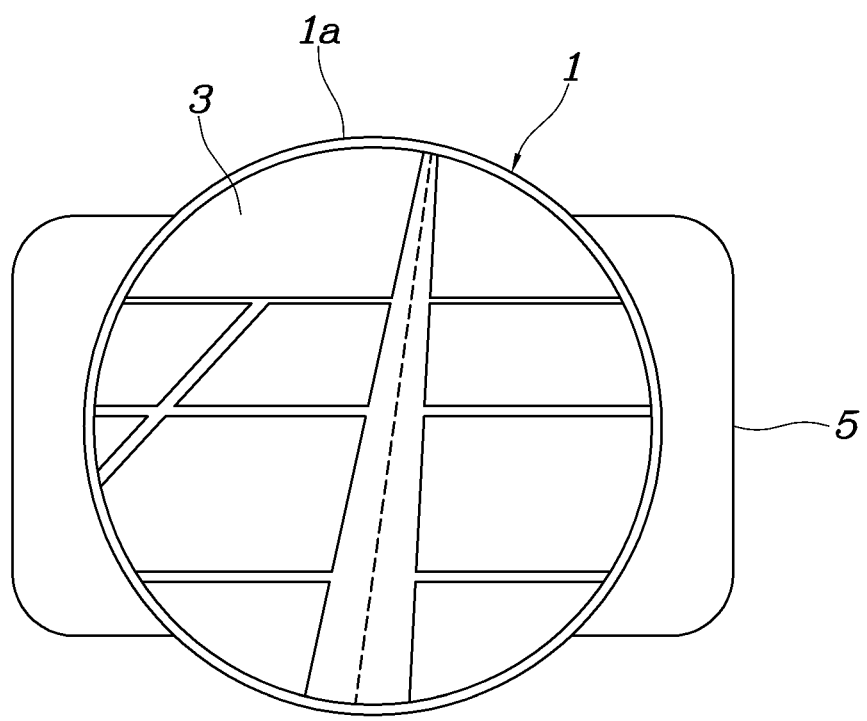
FIG. 2 is a view illustrating a configuration in which a steering wheel is provided with a display mechanism.

Specifically, referring to FIGS. 1A-1B and 2, the present disclosure is applicable to a vehicle equipped with an SBW system and designed to be capable of autonomous travel. For example, a steering wheel 1 is provided with a steering reaction force system 5 so as to provide steering feeling and a steering reaction force, and a steering gear box is provided with a tire steering system 7 so as to steer a tire according to the steering rotation of the steering wheel 1.

The display mechanism 3 is provided in the central portion of the steering wheel 1 and is capable of displaying the rotating position of the steering wheel 1.

For example, the display mechanism 3 may be provided in a shape fitted to a central space of the rim 1a of the steering wheel 1 and may be a circular touch panel.

That is, a virtual spoke image of the steering wheel 1 is displayed on the display mechanism 3, so that the rotating position of the steering wheel 1 can be displayed.

The display mechanism 3 may be configured such that travel requirements such as destination input and correction are input in the autonomous travel mode and the travel route to the destination is displayed.

In addition, the steering angle of the tire is input to the controller C, and a control may be performed such that the rotating position of the steering wheel 1 according to the steering angle of the tire is displayed on the display mechanism 3 when switching from the autonomous travel mode to the driver travel mode is performed.

Now, a vehicle travel control method of the present disclosure using the travel control system is described. When the controller C determines that switching from the autonomous travel mode to the driver travel mode is performed, the controller C may perform a control such that the display mechanism 3 provided in the central portion of the steering wheel 1 displays the rotating position of the steering wheel 1.

Figure 3:
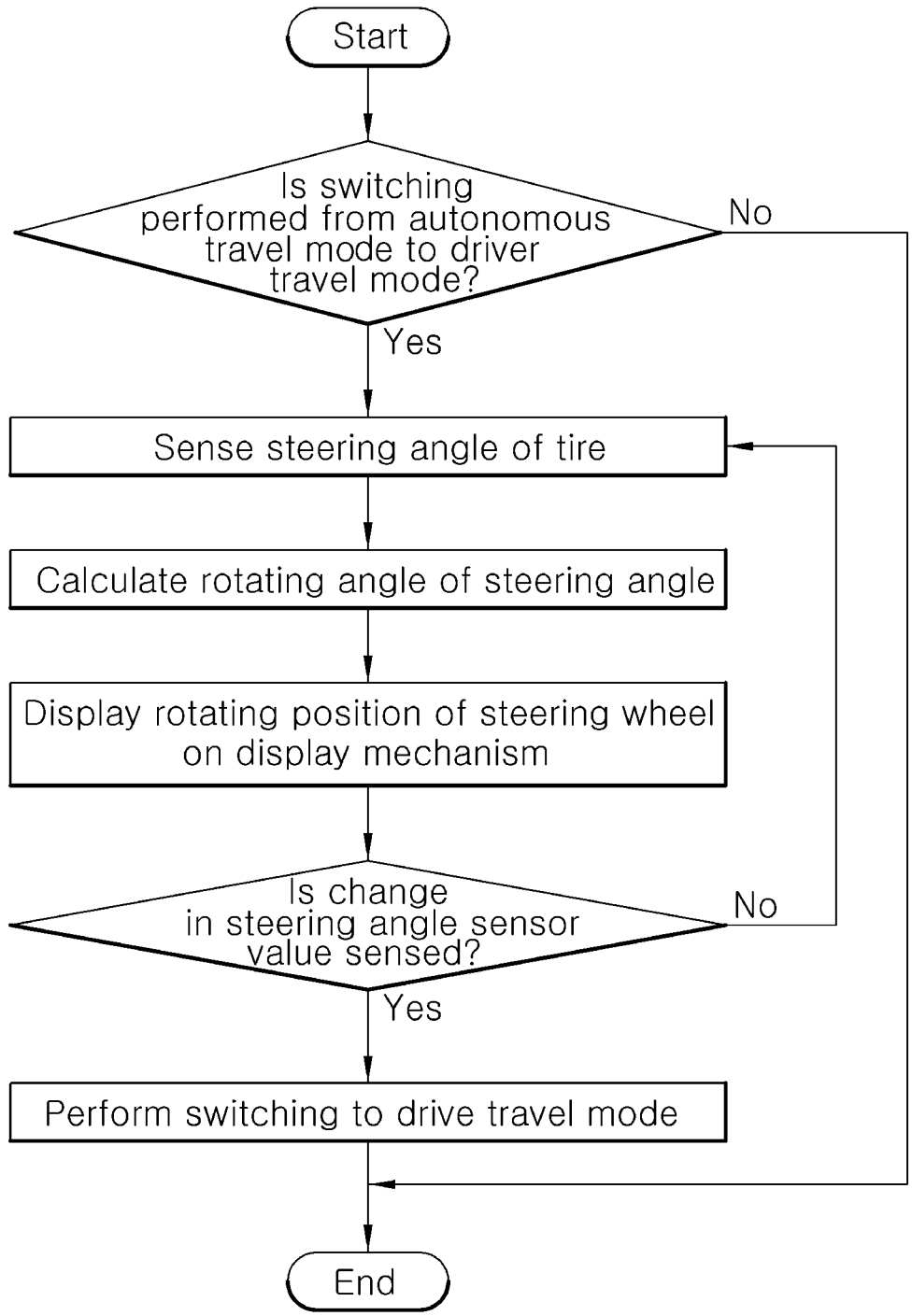
FIG. 3 is a flowchart illustrating a vehicle travel control process.

Specifically, referring to FIG. 3, when the controller C determines that the current travel mode is switched from the autonomous travel mode to the driver travel mode according to the driver's intention, the steering angle of the tire may be input.

Then, the controller C may calculate the rotating angle of the steering wheel 1 corresponding to the tire steering angle.

The controller C may control the display mechanism 3 to display the rotating position corresponding to the calculated rotating angle of the steering wheel 1.

That is, when switching the travel mode from the autonomous travel mode to the driver travel mode, the virtual spoke image of the steering wheel 1 based on the current tire steering angular position is displayed on the display mechanism 3, and the rotating position of the steering wheel 1 is recognized, so that the driver can easily determine the rotating position of the steering wheel 1 corresponding to the tire steering angle without a physical synchronization process between the tire steering angle and the steering wheel 1.

In addition, a control may be performed such that when the steering angle of the tire changes, the steering wheel 1 does not rotate and only the rotating position of the steering wheel 1 displayed on the display mechanism 3 rotates in accordance with the steering angle of the tire.

Figure 4A:
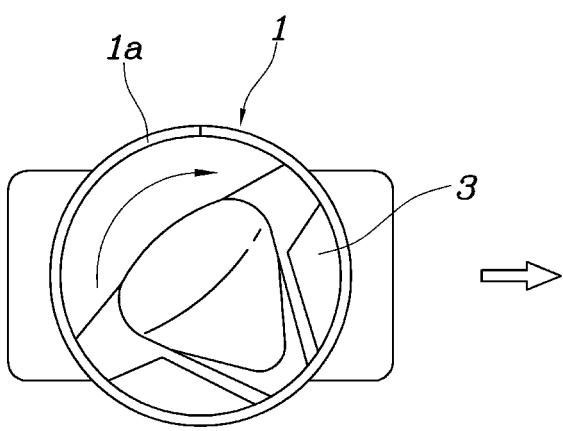
FIGS. 4A and 4B are views for illustrating a change in rotating position of a steering wheel before a driver rotates the steering wheel during the switching of the driver travel mode.
Figure 4B:
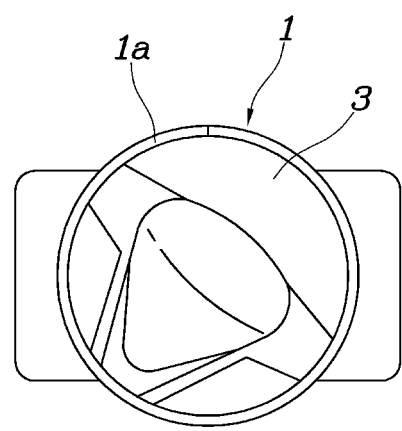

That is, in the case in which the travel mode is switched to the driver travel mode, before the driver grips the steering wheel 1, the steering wheel 1 does not rotate as illustrated in FIGS. 4A-4B, but only the rotating position of the steering wheel 1 displayed on the display mechanism 3 (an image spoke) can be rotated.

Figure 5A:
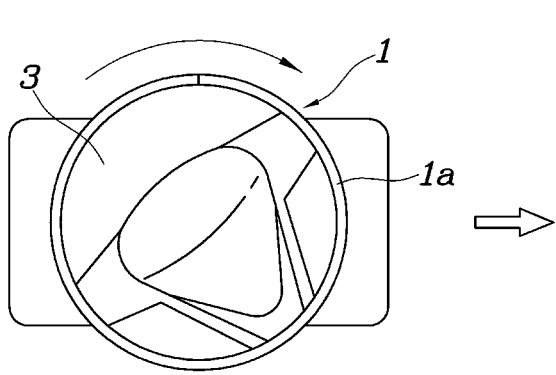
FIGS. 5A and 5B are views for illustrating a change in rotating position of the steering wheel after the driver rotates the steering wheel during the switching of the driver travel mode.
Figure 5B:
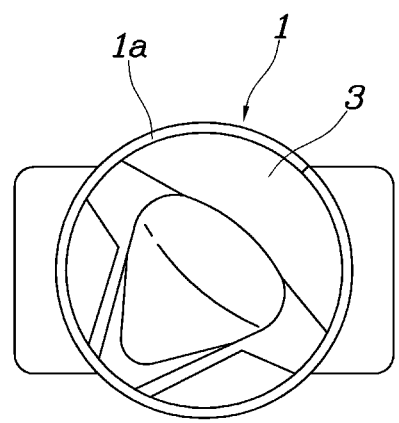

However, when the driver rotates the steering wheel 1 after the travel mode is switched to the driver travel mode, the rotating position of the steering wheel 1 may be rotated together with the rotation of the steering wheel 1 as illustrated in FIGS. 5A-5B.

To this end, in the present disclosure, when the driver rotates the steering wheel 1, it is possible to determine whether the steering wheel 1 is rotated by an external force.

Accordingly, when it is determined that the steering wheel (namely, the physical steering wheel 1) is rotated, the rotating position of the steering wheel 1 displayed on the display mechanism 3 (e.g., a virtual spoke image of the steering wheel 1) can be controlled to rotate in accordance with the rotation of the steering wheel 1 (i.e., the physical steering wheel 1).

That is, when the rotation of the physical steering wheel 1 according to the driver's intention is sensed, the vehicle is driven according to the driver's intention rather than by the controller C. The spoke image output to the display mechanism 3 is stopped in that state and then rotates together with the physical steering wheel 1, thereby providing the driver with a travel performance free of a sense of difference in the steering feeling.

At this time, it may be determined whether or not the steering wheel 1 is rotated using a steering angle sensor provided on the steering wheel 1. Therefore, since reflection of the driver's travel intention can be determined based on the steering angle sensor value of the steering wheel 1 rather than based on the steering torque, it is possible to omit a torque sensor.

As described above, in the present disclosure, when switching from the autonomous travel mode to the driver travel mode is performed, the virtual spoke image of the steering wheel 1 based on the current angular steering position of the tire is displayed on the display mechanism 3, so that the rotating position of the physical steering wheel 1 can be recognized.

Therefore, the driver is able to easily determine the rotating position of the steering wheel 1 corresponding to the steering angle of the tire, without any physical synchronization between the steering angle of the tire and the steering wheel 1. Thus, the driver is able to quickly and naturally switch the travel mode from the autonomous travel mode to the driver travel mode without different steering feeling caused by the mode switch.

While the present disclosure has been described in detail only with reference to exemplary forms thereof, it is evident to those ordinarily skilled in the art that various changes and modifications can be made within the scope of the technical idea of the present disclosure, and it is natural that such modifications and changes are included in the scope of the present disclosure.

What is claimed is:

1. A travel control method of an autonomous vehicle equipped with a steer-by-wire (SBW) system, the travel control method comprising:
   determining, by a controller, whether a travel mode is switched from an autonomous travel mode to a driver travel mode;
   in response to determining that the travel mode is switched to the driver travel mode, receiving, by a controller, an input steering angle of a tire of the autonomous vehicle, and calculating, a rotating angle of a steering wheel corresponding to the steering angle of the tire; and
   controlling, by the controller, a display mechanism provided in a central portion of the steering wheel, and displaying on the display mechanism a virtual image illustrating a rotating position of the steering wheel corresponding to the calculated rotating angle of the steering wheel;
   determining whether the steering wheel is further rotated by a user of the autonomous vehicle; and
   in response to determining that the steering wheel is rotated by the user, displaying, on the display mechanism, a further rotated position of the steering wheel corresponding to the rotation of the steering wheel by the user.

2. The travel control method of claim 1, wherein whether or not the steering wheel rotates is determined using a steering angle sensor provided on the steering wheel.

\* \* \* \* \*